United States Patent [19]

Bartell

[11] Patent Number: 4,999,532
[45] Date of Patent: Mar. 12, 1991

[54] STRAIN RELIEF AND SUPPORT FOR ELECTRIC MOTOR WIRING

[75] Inventor: Robert J. Bartell, Owosso, Mich.

[73] Assignee: Magnetek Universal Electric, Owosso, Mich.

[21] Appl. No.: 470,618

[22] Filed: Jan. 26, 1990

[51] Int. Cl.⁵ .............................................. H02K 15/08
[52] U.S. Cl. ...................................... 310/71; 439/457
[58] Field of Search ................. 310/68 R, 71, 254, 43; 336/192; 439/452, 456, 457, 459, 871

[56] References Cited

U.S. PATENT DOCUMENTS

| | | | |
|---|---|---|---|
| 3,974,407 | 8/1976 | Dochterman | 310/71 |
| 4,287,446 | 9/1981 | Lill et al. | 310/71 |
| 4,569,125 | 2/1986 | Antl et al. | 310/71 |
| 4,719,379 | 1/1988 | Daniels et al. | 310/71 |
| 4,801,833 | 1/1989 | Dye | 310/68 C |

Primary Examiner—Steven L. Stephan
Assistant Examiner—D. L. Rebsch
Attorney, Agent, or Firm—Barnes, Kisselle, Raisch, Choate, Whittemore & Hulbert

[57] ABSTRACT

An electric motor comprising a stator having radially inwardly extending circumferentially spaced polar segments and a plastic support on each axial end of the stator. Each support has substantially the same configuration as the cross sectional configuration of the ends of the stator, including segments overlying the segments of the stator. Each segment includes an axially outwardly extending wall, and a coil is wound around each stator segment and segment of said support. Integral strain relief portions are provided on each support for connecting the coils and for connecting power leads to the ends.

10 Claims, 3 Drawing Sheets

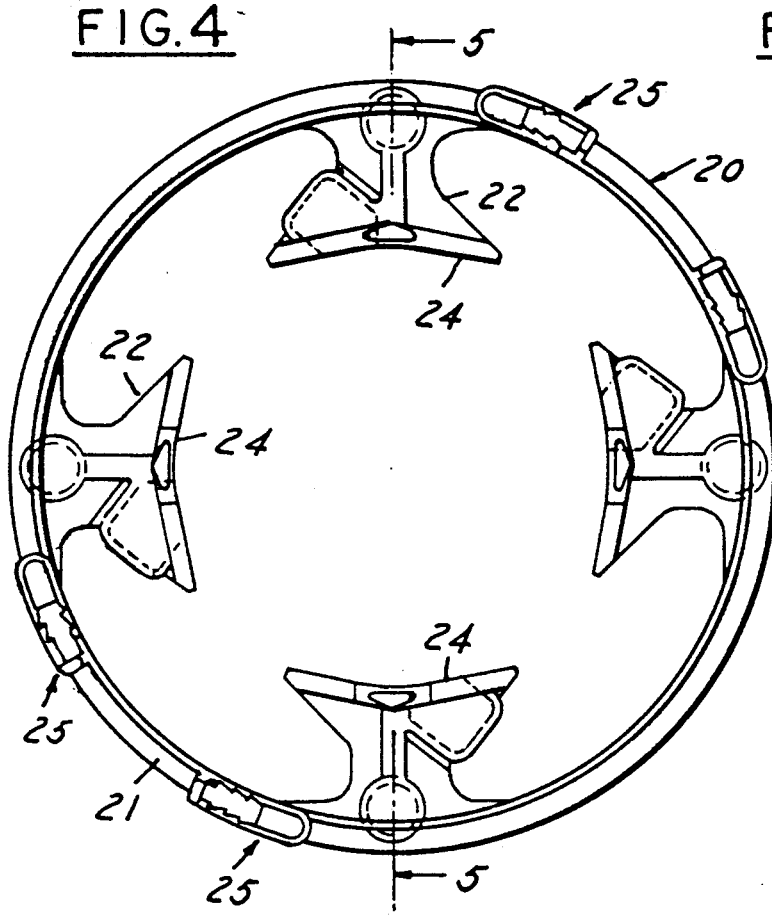
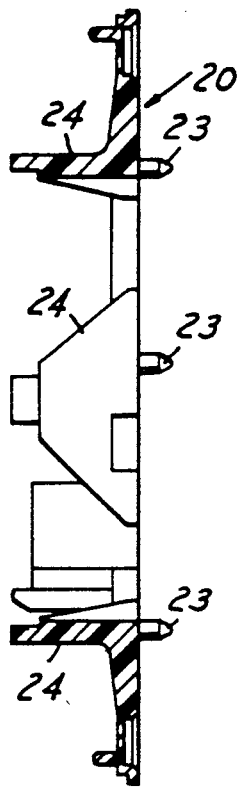
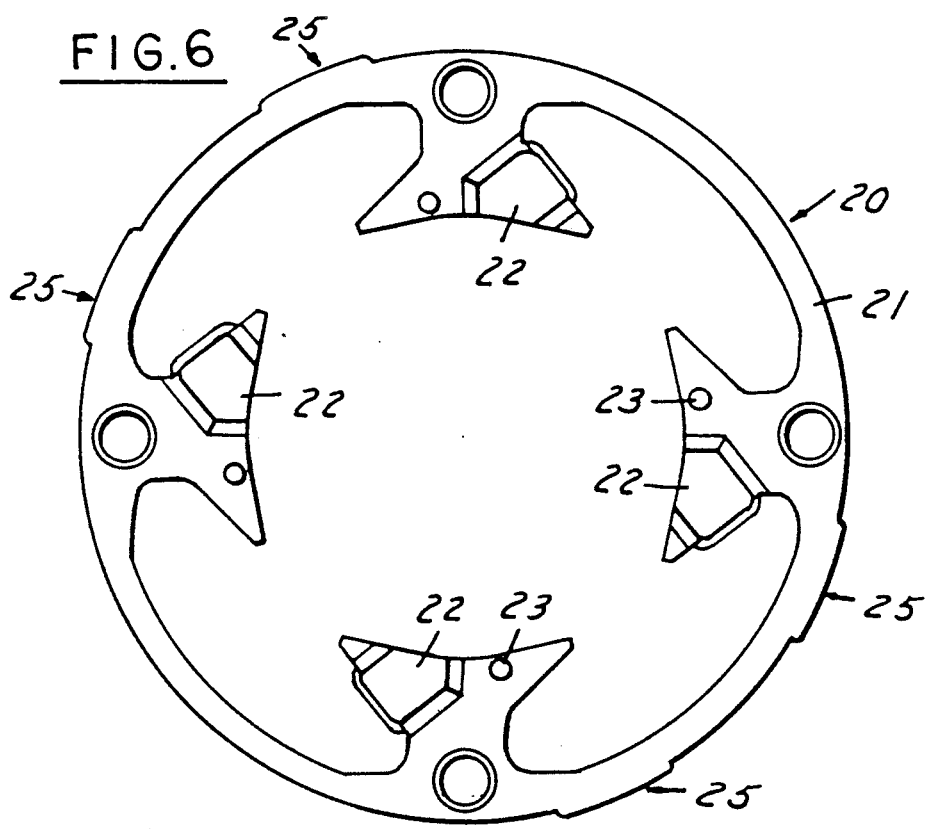

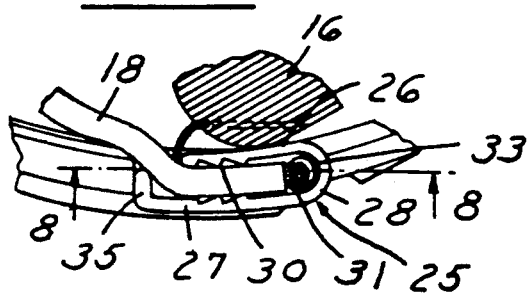
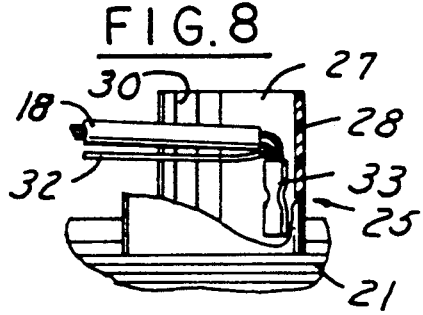
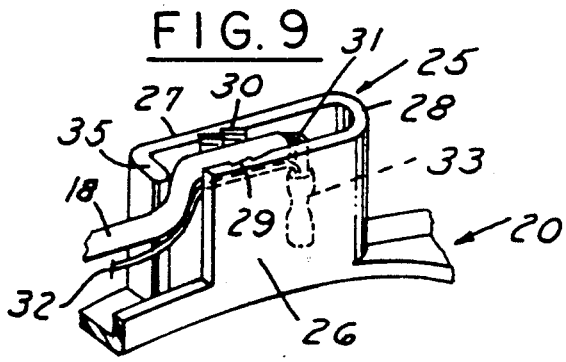
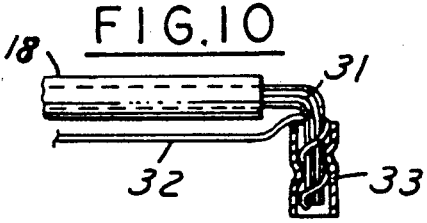
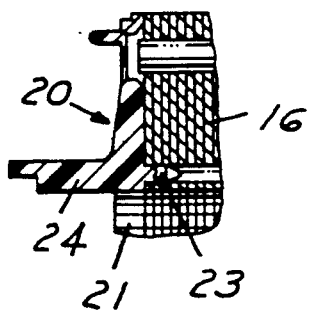
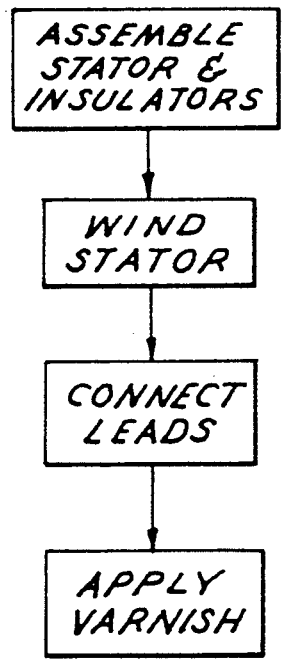
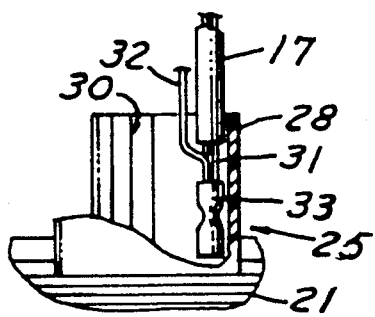

STRAIN RELIEF AND SUPPORT FOR ELECTRIC MOTOR WIRING

This invention relates to electric motors.

BACKGROUND AND SUMMARY OF THE INVENTION

Electric motors conventionally comprise a housing, a stator in the housing and a rotor rotatably mounted in the housing and adapted to be rotated when the electrical power is supplied to the stator. The stator may comprise a plurality of laminations which, in turn, support a plurality of windings. Such a motor further includes a strain relief device which isolates the external leads from the wiring of the stator.

In an electric motor such as shaded pole motor, for example, the stator may have two or more integral segments extending radially inwardly and a coil may be wound about each of the segments. In the manufacture of stators, it is common to apply an insulator coating such as an epoxy coating to the stator before the coil is wound about the segment of the stator to isolate the windings of the coil from the metal of the stator.

Among the objectives of the present invention are to provide an electric motor wherein all varnishing can be achieved after the motor stator is completed without any need for insulating, coatings or varnish as a preliminary step in manufacture; and wherein a separate strain relief is not required apart from the motor stator construction itself; wherein circumferentially spaced integral strain relief connectors are provided on each stator member for interconnecting the coils and power leads.

In accordance with the invention, an electric motor comprising a stator having a plurality of radially inwardly extending circumferentially spaced polar segments and a plastic stator member on each axial end of the stator. Each member has substantially the same configuration as the cross sectional configuration of the ends of the stator, including segment portions overlying the segments of the stator. Each segment portion includes an axially outwardly extending wall and a coil is wound around each stator segment and segment portion of said stator member. Integral strain relief portions are provided on each stator member for connecting the coils and for connecting power leads to the ends.

DESCRIPTION OF THE DRAWINGS

FIG. 4 is an end view of a plastic stator end member utilized in the motor.

FIG. 5 is a sectional view taken along the line 5—5 in FIG. 4.

FIG. 6 is an opposite end view of the member shown in FIG. 4.

FIG. 7 is a fragmentary end view on an enlarged scale showing a portion of the integral strain relief connection.

FIG. 8 is a fragmentary sectional view taken along the line 8—8 in FIG. 7.

FIG. 9 is a fragmentary perspective view of the integral strain relief connector.

FIG. 10 is a view of the connector leads.

FIG. 11 is a fragmentary sectional view of a portion of the stator and plastic stator end member.

FIG. 12 is a fragmentary sectional view similar to FIG. 9 prior to final positioning of the leads.

FIG. 13 is a diagram showing the assembly steps in making the motor.

DESCRIPTION

Figure 1:
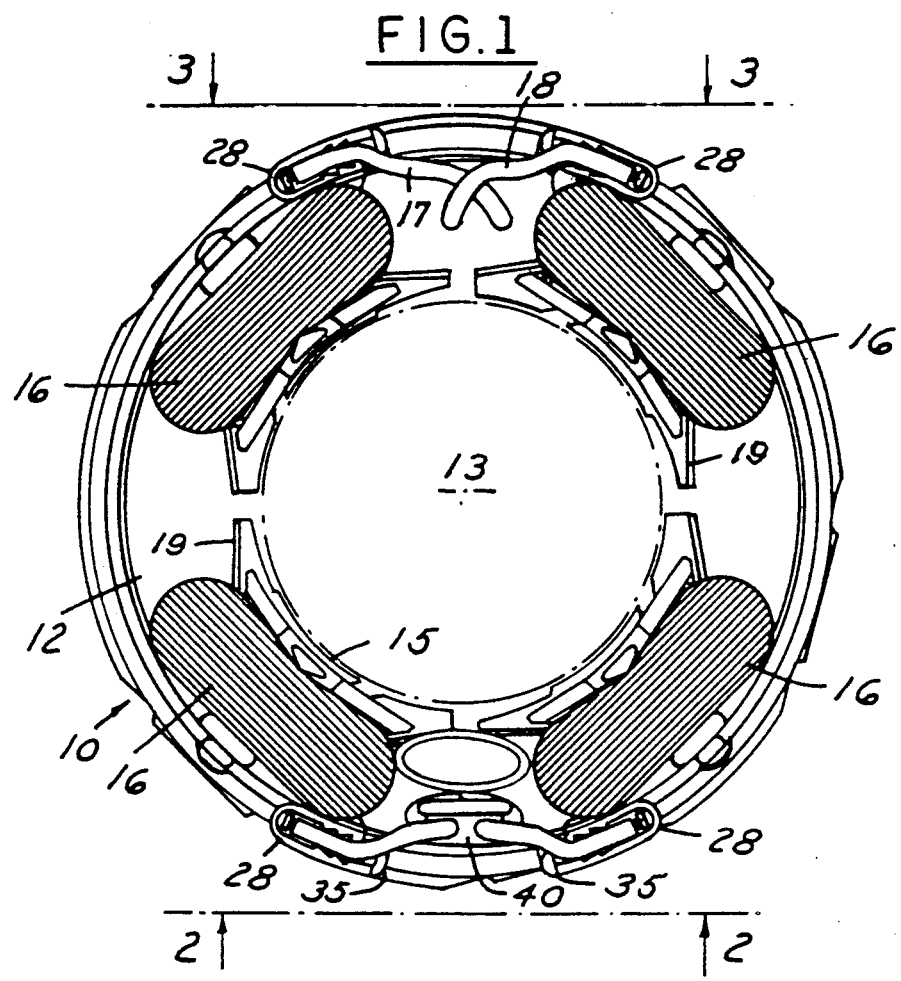
FIG. 1 is an end view of an electric motor embodying the invention with the end member removed.
Figure 2:
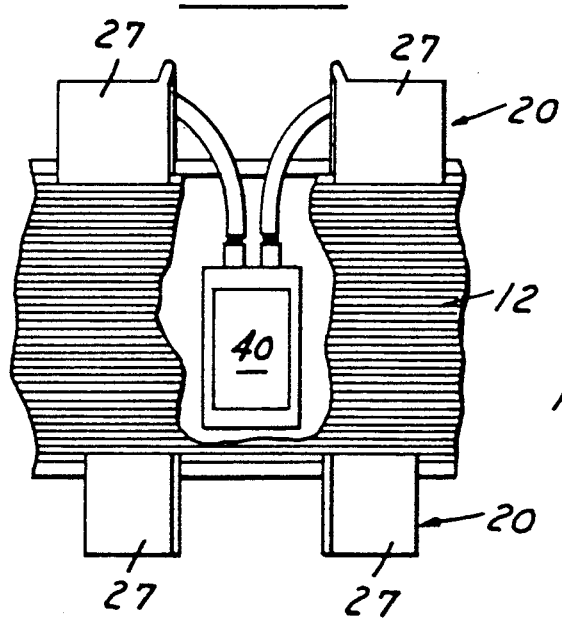
FIG. 2 is a fragmentary part sectional view taken along the line 2—2 in FIG. 1.
Figure 3:
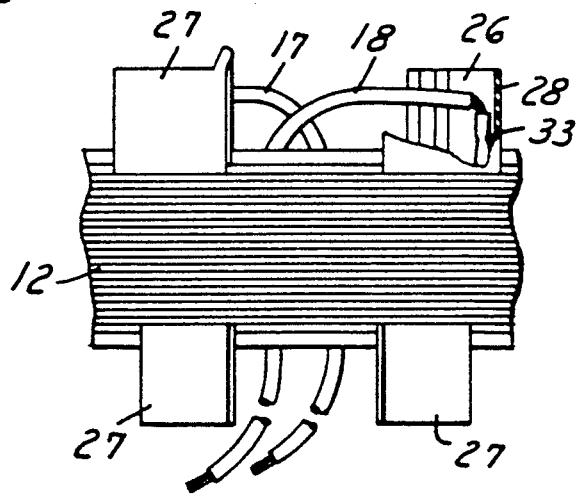
FIG. 3 is a fragmentary part sectional view taken along the line 3—3 in FIG. 2.

Referring to FIGS. 1-10, an electric motor embodying the invention may be of the shaded pole type such as shown in U.S. Pat. Nos. 2,827,583, 3,975,654 and 3,567,973, incorporated herein by reference, which includes a housing 10 comprising a cylindrical shell (not shown), a stator 12 mounted in the shell and a rotor 13 rotatably mounted between end members (not shown) on the shell.

In accordance with conventional construction, the stator 12 includes a plurality of pole segments 15 extending radially inwardly and having narrow neck portions intermediate their ends, as shown, for example, in the aforementioned U.S. patents, incorporated herein by reference. A coil 16 is wound around the narrow portion of each segment 15. In the motor shown, four segments are provided and the windings of the coils thereon are interconnected one to the other and, in turn, to leads 17, 18, as presently described, which extend to external wiring through which the stator is energized. Slot insulation liners 19 are provided in the slots, in accordance with conventional construction.

In accordance with the invention, a plastic stator member 20 at each end of the stator 12 has the same general configuration as the stator 12. More specifically, the member 20 includes a ring 21 and radial portions 22 having substantially the configuration of the pole segments 15, that is, extending radially inwardly and having a narrow neck portion overlying the respective segments. The member 20 further includes axially extending integral pins 23 that engage complementary openings in the stator to locate them circumferentially. Each member 20 further includes an axially extending wall 24 which is generally trapezoidal in configuration and is provided on the inner end of each portion 22 to serve as a guide for the winding of the coils 16 on each segment 15.

The member 20 further includes a plurality of integral strain relief devices 25 extending axially from the ring portion 21.

As shown in FIGS. 7, 8 and 9, each strain relief portion 25 includes radially spaced inner and outer axially extending walls 26, 27 connected by an integral axially extending portion 28. The inner surfaces of the walls 26, 27 are provided with unsymmetrical teeth 29, 30 which are adapted to grip the insulation on a wire, as presently described. An integral free edge 25 extends from one wall 27 toward the other wall 26.

The plastic stator member 20 is preferably made of polyester.

Although the invention has been described in connection with shaded pole motors, it is also applicable to other types of motors including series and permanent magnet types.

In making the connection, for example, to the external coated wires 17, 18, the end of the wire 31 within the coated wire 18 is connected to the lead 32 from the adjacent coil 16 by soldering, crimping or otherwise, herein shown by a crimped member 33. The end is then moved axially into the area of juncture of the walls 26, 27, 28, as shown in FIG. 12, and then the wire 17 is bent so that the insulated lead 17 or 18 extends between the teeth 29, 30 and the wire is moved through the space between the radial wall on wall 27 providing a positive engagement of the insulated lead which is sufficient to serve as a strain relief of the leads 17, 18.

The steps in the manufacture of the stator are set forth diagrammatically in FIG. 13 and include:

Assembly of the stator 12 and insulator member 20;

Insertion of slot insulation to insulate the walls of the winding slots;

Winding the stator; and

Connecting the leads and inserting the connections in the strain relief devices 25 followed by coating as by dipping in varnish to coat the entire stator.

One pair of leads 17, 18 may be connected through an overload assembly 40.

It can thus be seen that there has been provided an electric motor wherein all the varnishing can be achieved after the motor is completed without any need for insulating, coatings, or varnish as a preliminary step to the winding of the coils and wherein there is no need for a separate strain relief apart from the motor stator construction itself.

I claim:

1. An electric motor comprising
   a stator having radially inwardly extending circumferentially spaced polar segments,
   a plastic support on each axial end of the stator,
   each support having substantially the same configuration as the cross sectional configuration of the respective end of the stator and including a guide overlying the segments of the stator, and
   a coil wound around each support and guide of the stator member,
   each guide of the plastic support including an axially extending outwardly extending wall providing a guide for the coil,
   integral strain relief devices provided on the plastic support,
   said integral strain relief devices being provided about the periphery of the plastic support,
   each strain relief device comprising radially spaced wall having inwardly facing teeth for receiving a covered wire,
   an integral wall connecting said radially spaced walls and extending axially for receiving the joined ends of connected wires.

2. The electric motor set forth in claim 1 wherein adjacent coils have leads with wire ends connected to one another and extending axially of the motor, said wires bent so that the leads extend between the teeth on the walls of one of said strain relief devices.

3. The electric motor set forth in claim 2 wherein another set of adjacent coils includes wire ends, an overload assembly having a pair of leads connected to said respective wire ends to form a pair of connected ends, each connected pair of leads extending into a respective strain relief device.

4. The electric motor set forth in claim 3 wherein one of said walls of each said strain relief device includes an integral free edge extending toward the other of said walls.

5. The electric motor set forth in any of claims 1-4 including an insulating coating over the entire stator.

6. An electric motor comprising
   a stator having radially inwardly extending circumferentially spaced polar segments,
   a plastic support on each axial end of the stator,
   each support having substantially the same configuration as the cross sectional configuration of the respective end of the stator and including a guide overlying the segments of the stator, and
   a coil wound around each support and guide of the stator member,
   integral strain relief devices provided on the plastic support,
   said integral strain relief devices being provided about the periphery of the plastic support,
   each strain relief device comprising radially spaced wall having inwardly facing teeth for receiving a covered wire,
   an integral wall connecting said radially spaced walls and extending axially for receiving the joined ends of connected wires.

7. The electric motor set forth in claim 6 wherein adjacent coils have leads with wire ends connected to one another and extending axially of the motor, said wires bent so that the leads extend between the teeth on the walls of one of said strain relief devices.

8. The electric motor set forth in claim 7 wherein another set of adjacent coils includes wire ends, an overload assembly having a pair of leads connected to said respective wire ends to form a pair of connected ends, each connected pair of leads extending into a respective strain relief device.

9. The electric motor set forth in claim 8 wherein one of said walls of each said strain relief device includes an integral free edge extending toward the other of said walls.

10. The electric motor set forth in any of claims 6-9 including an insulating coating over the entire stator.

* * * * *